(12) United States Patent
Xu et al.

(10) Patent No.: US 12,341,156 B2
(45) Date of Patent: Jun. 24, 2025

(54) HYBRID SOLID-LIQUID ELECTROLYTE LITHIUM STORAGE BATTERY

(71) Applicant: ZHEJIANG FUNLITHIUM NEW ENERGY TECH CO., LTD., Zhejiang (CN)

(72) Inventors: Xiaoxiong Xu, Zhejiang (CN); Chao Ding, Zhejiang (CN); Yonglong Zhang, Zhejiang (CN); Zanzan Zhang, Zhejiang (CN)

(73) Assignee: ZHEJIANG FUNLITHIUM NEW ENERGY TECH CO., LTD., Zhejiang (CN)

( * ) Notice: Subject to any disclaimer, the term of this patent is extended or adjusted under 35 U.S.C. 154(b) by 766 days.

(21) Appl. No.: 17/436,558

(22) PCT Filed: Jun. 22, 2019

(86) PCT No.: PCT/CN2019/092434
§ 371 (c)(1),
(2) Date: Sep. 3, 2021

(87) PCT Pub. No.: WO2020/181681
PCT Pub. Date: Sep. 17, 2020

(65) Prior Publication Data
US 2022/0181684 A1 Jun. 9, 2022

(30) Foreign Application Priority Data
Mar. 12, 2019 (CN) .......................... 201910184464.5

(51) Int. Cl.
*H01M 10/0565* (2010.01)
*H01M 10/0525* (2010.01)
*H01M 10/0585* (2010.01)

(52) U.S. Cl.
CPC ... *H01M 10/0565* (2013.01); *H01M 10/0525* (2013.01); *H01M 10/0585* (2013.01);
(Continued)

(58) Field of Classification Search
CPC ......... H01M 10/0561; H01M 10/0562; H01M 10/0565; H01M 10/0585
See application file for complete search history.

(56) References Cited

U.S. PATENT DOCUMENTS

| 9,589,733 B2 * | 3/2017 | Vilc | H01G 9/025 |
| 2012/0231346 A1 * | 9/2012 | Tsujii | H01M 4/13 29/25.03 |

(Continued)

FOREIGN PATENT DOCUMENTS

| CN | 108598563 A | * | 9/2018 | ........ H01M 10/0525 |
| CN | 111066189 A | * | 4/2020 | ............... H01B 1/06 |

(Continued)

OTHER PUBLICATIONS

Machine translation of CN 108630985 (no date) (Year: 0000).*
(Continued)

*Primary Examiner* — Amanda C. Walke
(74) *Attorney, Agent, or Firm* — Bayramoglu Law Offices LLC

(57) ABSTRACT

The present invention belongs to the technical field of solid-state lithium batteries, and particularly discloses a hybrid solid-liquid electrolyte lithium battery. The lithium battery includes a positive electrode plate, a negative electrode plate and a composite solid electrolyte sheet arranged between the positive electrode plate and the negative electrode plate, wherein the composite solid electrolyte sheet includes a solid electrolyte core layer and buffer adhesive layers arranged on both sides of the solid electrolyte core layer, wherein the solid electrolyte core layer is mainly (Continued)

formed by mixing a core layer inorganic solid electrolyte, an electrolyte polymer and an electrolyte additive, and the buffer adhesive layer mainly formed by mixing a buffer adhesive layer inorganic solid electrolyte, a buffer adhesive layer lithium salt and a buffer adhesive layer additive. The lithium battery of the present invention is prepared by combining coextrusion technology and rolling technology to achieve one-time processing and forming, which has the characteristics of a high production efficiency, and a simple operation, and the obtained lithium battery has relatively higher electric cycle performance and safety performance.

16 Claims, 4 Drawing Sheets

(52) U.S. Cl.
CPC ............. *H01M 2300/0068* (2013.01); *H01M 2300/0091* (2013.01)

(56) References Cited

U.S. PATENT DOCUMENTS

| | | | |
|---|---|---|---|
| 2015/0024279 A1* | 1/2015 | Tan | H01M 10/0565 429/233 |
| 2015/0037655 A1* | 2/2015 | Zhou | H01M 10/0585 429/149 |
| 2018/0013171 A1* | 1/2018 | Sakamoto | C04B 35/50 |
| 2018/0083304 A1* | 3/2018 | Horibe | H01M 4/485 |
| 2019/0051936 A1* | 2/2019 | Meshcheryakov | H01M 6/40 |
| 2019/0088949 A1* | 3/2019 | Makino | H01M 10/0585 |
| 2019/0157710 A1* | 5/2019 | Makino | H01M 4/1395 |
| 2020/0144575 A1* | 5/2020 | Ku | H01M 50/461 |
| 2020/0212500 A1* | 7/2020 | Ogawa | H01M 10/0562 |
| 2022/0131153 A1* | 4/2022 | Yan | H01M 10/052 |

FOREIGN PATENT DOCUMENTS

| | | | | |
|---|---|---|---|---|
| KR | 20230149037 A | * | 10/2023 | |
| WO | WO-2012164724 A1 | * | 12/2012 | ............. H01B 1/122 |
| WO | WO-2019188840 A1 | * | 10/2019 | ........ H01M 10/0525 |
| WO | WO-2023210188 A1 | * | 11/2023 | |

OTHER PUBLICATIONS

Translation of WO 2020/181681 Written Opinion (ETWOS) (no date) (Year: 0000).*

Zhang et al., High-efficiency and low-cost preparation of solid electrolytes Li7La3Zr2O12 based on molten salt method, Journal of Alloys and Compounds, 881, 16020 (2021) (Year: 2021).*

Zheng et al., A Fundamental Stability Study for Amorphous LiLaTiO3 Solid Electrolyte, Journal of The Electrochemical Society, 162, A244 (2015) (Year: 2015).*

* cited by examiner

HYBRID SOLID-LIQUID ELECTROLYTE LITHIUM STORAGE BATTERY

TECHNICAL FIELD

The invention belongs to the technical field of lithium batteries, and particularly relates to a hybrid solid-liquid electrolyte lithium battery.

BACKGROUND ART

In a hybrid solid-liquid electrolyte lithium battery, the solid electrolyte is a main electrolyte component, and the liquid electrolyte is auxiliary to the solid electrolyte. Compared with a traditional liquid lithium battery, the hybrid solid-liquid electrolyte lithium battery has advantages, such as a high energy density, a good mechanical performance, and a good safety. In the case of the use of the hybrid solid-liquid electrolyte, metal lithium can be directly used as a negative electrode in the lithium battery, which significantly increases the energy density of the battery, and at the same time, the solid electrolyte membrane can also inhibit the formation of lithium dendrite crystals, such that the safety performance of the lithium battery is significantly improved.

Currently, there are three main categories of solid electrolytes: (1) an organic polymer electrolyte, (2) an inorganic solid electrolyte, and (3) a composite electrolyte compounded from an organic polymer electrolyte and an inorganic solid electrolyte.

An organic polymer electrolyte battery is easy to process and can be formed by continuing to use the existing lithium-ion battery process, but the battery has a low room temperature conductivity. Although an inorganic solid electrolyte has a relatively high room temperature conductivity, it has relatively high material cost and a complicated battery process, and it is necessary to develop a lot of completely new battery production apparatus, resulting in further increase in costs.

Compared with the previous two types of solid electrolytes, a composite electrolyte has the easy processability of an organic polymer electrolyte and can improve the room temperature conductivity to a certain extent, but the mechanical strength thereof is poor, which easily leads to easy rupture of the membrane, thereby resulting in short circuit of a battery. Therefore, a separator made of polymers such as PP and PE is usually applied between a composite electrolyte and a positive electrode material to ensure the separation of the positive and negative electrodes in a lithium battery while providing good supporting function for the composite electrolyte membrane to ensure the safety of the lithium battery.

However, although the separator has a good supporting function, but if the separator is ruptured caused by puncturing or impacting of foreign objects such as a steel needle, the liquid electrolyte in a lithium battery will fill the ruptured part of the separator, such that the positive electrode and negative electrode inside the lithium battery are connected with each other, resulting in a short circuit of the lithium battery, thus the lithium battery has some potential safety hazards.

SUMMARY OF THE INVENTION

In view of the defects of the prior art, an object of the present invention is to provide a hybrid solid-liquid electrolyte lithium battery. The lithium battery, in which a separator is omitted, still has a good mechanical strength, and ensures the excellent electric cycle performance, and has a relatively high safety at the same time. For the lithium battery, the one-time forming of the lithium battery is achieved by means of an extrusion technology, which has a simple and convenient operation, and improve the production efficiency of the lithium battery.

To fulfill the above-mentioned object, the present invention provides the following technical solution:

a hybrid solid-liquid electrolyte lithium battery, comprising a positive electrode plate, a negative electrode plate and a composite solid electrolyte sheet arranged between the positive electrode plate and the negative electrode plate, wherein the composite solid electrolyte sheet comprises a solid electrolyte core layer, a first buffer adhesive layer arranged on the solid electrolyte core layer at the side facing the positive electrode plate and a second buffer adhesive layer arranged on the solid electrolyte core layer at the side facing the negative electrode plate, wherein the solid electrolyte core layer is mainly formed by mixing a core layer core inorganic solid electrolyte, an electrolyte polymer and an electrolyte additive; the first buffer adhesive layer and the second buffer adhesive layer mainly comprise one or a mixture of more of a buffer adhesive layer inorganic solid electrolyte, a buffer adhesive layer lithium salt and a buffer adhesive layer additive, and the weight of the first buffer adhesive layer or the second buffer adhesive layer accounts for 5%-70% of the weight of the composite solid electrolyte sheet.

According to the technical solution described above, in the solid electrolyte core layer, the core layer inorganic solid electrolyte ensures an excellent room temperature conductivity of the composite solid electrolyte sheet, the electrolyte polymer is uniformly mixed in the core layer inorganic solid electrolyte under the action of the electrolyte additive, and the polymer itself has good mechanical strength and thermal fusibility, which can improve the tackiness of the core layer inorganic solid electrolyte itself and between the core layer inorganic solid electrolyte and the first buffer adhesive layer and the second buffer adhesive layer to a certain extent, while providing a good supporting function for the core layer inorganic solid electrolyte, such that the solid electrolyte core layer has an excellent mechanical strength, thereby ensuring the excellent electric cycle performance of the lithium battery.

In addition, since the polymer generally has good insulation and resilience, and has a good tackiness in a molten state, the circuit isolation between the positive electrode plate and negative electrode plate can be achieved by mixing the polymer in the core layer inorganic solid electrolyte; with respect to the isolation of the separator, the electrolyte polymer in the present invention can also be used as a binder, i.e. it can be better dispersed between and bonded to the core layer inorganic solid electrolytes, such that the solid electrolyte core layer has a certain resilience, i.e., even if the solid electrolyte core layer is ruptured caused by puncturing or impacting of foreign objects such as a steel needle, the solid electrolyte core layer will shorten and even restore the ruptured gap under the action of the electrolyte polymer, so as to maintain the original excellent partition effect and ensure the excellent safety performance of a lithium battery;

the buffer adhesive layer inorganic solid electrolyte in the first buffer adhesive layer and the second buffer adhesive layer allows an ion concentration gradient between the electrolyte core layer and the positive electrode plate and the negative electrode plate, and then by the combination with the buffer layer lithium salt, to replenish a certain amount of a lithium ion for a lithium battery, thereby improving the electric cycle performance of the lithium battery; and the buffer adhesive layer additive can help the buffer adhesive layer inorganic solid electrolyte and the buffer layer lithium salt to be fully mixed to ensure the excellent buffering effect of the buffer adhesive layer.

In summary, the lithium battery of the present invention can maintain the excellent mechanical strength thereof with a separator being removed to ensure the normal use of the lithium battery, and at the same time improve the safety performance and battery performance of the lithium battery to a certain extent.

Both the positive electrode plate and the negative electrode plate in the present invention are made from some existing materials. The positive electrode material of the positive electrode plate is preferably one of or a mixture of more of $Li_{1+z}C_{O1-n}AnO_2$, a ternary material of $Li_{1+z}Ni_x$-$Co_yM_{1-x-y-n}AnO_2$, a lithium-rich manganese-based material of $mLi_2MnO_3 \cdot (1-m)Li_{1+z}Ni_xCo_yMn_{1-x-y-n}AnO_2$, nickel-manganese spinel $Li_{1+z}Ni_{0.5-h}Mn_{1.5-1}AnO_4$, lithium iron manganese phosphate $Li_{1+z}Fe_xMn_{1-x-n}AnPO_4$, lithium manganate $Li_{1+z}Mn_{2-n}AnO_4$, lithium iron phosphate $Li_{1+z}Fe_{1-n}AnO_4$, and the above positive electrode material coated with or physically mixed with a solid electrolyte; wherein $0 \leq z<0.1$, $0 \leq n<0.1$, $0<x<1$, $0<y<1$, $0<x+y+n<1$, $0<m<1$, $h+1=n$, M is Mn or Al, and A is at least one element of Ti, Mg, Al, Zr, Nb, Ba, La, V, W, Ag, and Sn.

The negative electrode active material of the negative electrode plate is preferably one or a mixture of more of a carbon material, a tin-based material, a silicon-based material, a transition metal oxide, metallic lithium, a lithium alloy, $Li_xC_6$ ($0<x \leq 1$), a lithium-containing transition metal nitride solid electrolyte and a lithium titanate-based material, wherein the carbon material comprises graphite, amorphous carbon, etc., the tin-based material comprises pure tin, a tin oxide, a tin alloy, etc., and the silicon-based material comprises nano-silicon, siliconous oxide, and a silicon-carbon composite material, etc.

Therefore, when the positive electrode material or the negative electrode material is selected in the preparation process of the present invention, a skilled person can make a choice according to actual needs, such that the prepared lithium battery has a more excellent performance. In addition, although the present invention discloses the above several positive electrode materials and negative electrode materials, but is not limited thereto.

Furthermore, the thickness ratio of the first buffer adhesive layer, the solid electrolyte core layer to the second buffer adhesive layer is (5-30):(40-90):(5-30).

Furthermore, in the solid electrolyte core layer, the weight ratio of the core layer inorganic solid electrolyte, the electrolyte polymer to the electrolyte additive is (40-89):(10-50):(1-10).

By a lot of experimental verification, the applicant obtains that when the thickness ratio of the first buffer adhesive layer, the solid electrolyte core layer to the second solid buffer adhesive layer is (5-30):(40-90):(5-30), and the weight ratio of the core layer inorganic solid electrolyte, the electrolyte polymer to the electrolyte additive is (40-89):(10-50):(1-10), the lithium battery correspondingly prepared therefrom has an excellent comprehensive performance and can be widely promoted and applied.

Furthermore, in the solid electrolyte core layer, the core layer inorganic solid electrolyte is one or a mixture of more of an oxide solid electrolyte, a sulfide solid electrolyte, and a nitride solid electrolyte.

The oxide solid electrolyte is one or a mixture of more of a garnet solid electrolyte material, a NASICON solid electrolyte material, a LISICON solid electrolyte material, and a perovskite solid electrolyte material.

The sulfide solid electrolyte is one or a mixture of more of crystalline or amorphous $Li_2S$—$P_2S_5$, crystalline $Li_4MS_4$, crystalline $Li_{10}NP_2S_{12}$, $Li_2S$, $Li_3PS_4$, $Li_3P(S_xO_{1-x})_4$ and a microcrystalline $Li_2S$—$P_2S_5$—LiX, wherein, M is selected from one or more of Si, Ge, and Sn, N is selected from one or more of Si, Ge, and Sn, X is selected from one or more of Cl, Br, and I, and $0<x<1$.

The nitride solid electrolyte is one or a mixture of two of $Li_3N$ and LiPON.

Compared with solid electrolyte materials of a polymer, a complex, a film etc., the oxide solid electrolyte, the sulfide solid electrolyte and the nitride solid electrolyte are chemically active, can rapidly produce electrons by ionization and have an excellent lithium ion conductivity, such that the lithium battery has an excellent conductivity.

Among the oxide solid electrolytes disclosed, the garnet solid electrolyte material is preferably $Li_7A_3B_2O_{12}$, wherein A is one or more of La, Ca, Sr, Ba, and K, and B is one or more of Zr, Ta, Nb, and Hf; the NASICON solid electrolyte is preferably $Li_{1+x}A_xB_{2+x}(PO_4)_3$, wherein x is between 0.01-0.5, A is one or more of Al, Y, Ga, Cr, In, Fe, Se, and La, and B is one or more of Ti, Ge, Ta, Zr, Sn, Fe, V, and Hf; the LISICON solid electrolyte is preferably $Li_{14}A(BO_4)_4$, wherein A is one or more of Zr, Cr, and Sn, and B is one or more of Si, S, and P; and the perovskite solid electrolyte is preferably $Li_{3x}A_{2/3-x}BO_3$, wherein x is between 0.01-0.5, A is one or more of La, Al, Mg, Fe, and Ta, and B is one or more of Ti, Nb, Sr, and Pr. Although the present invention discloses the above oxide solid electrolytes, but is not limited thereto.

Furthermore, in the solid electrolyte core layer, the electrolyte polymer is one or a mixture of more of PEO, polysiloxane, PPC, PEC, PVC, PAN, PAA, PVDF, PVDF-HFP, PMMA, NHD, and PEI.

Polyethylene oxide (PEO), polysiloxane, polypropylene carbonate (PPC), polyethylene carbonate (PEC), polyvinyl chloride (PVC), polyacrylonitrile (PAN), polyacrylic acid (PAA), polyvinylidene fluoride (PVDF), polyvinylidene fluoride-hexafluoropropylene (PVDF-HFP), polymethyl methacrylate (PMMA), polyethylene glycol dimethyl ether (NHD), and polyetherimide (PEI) can all be better filled in inorganic solid electrolyte particles to obtain a composite solid electrolyte sheet with a microporous structure, and the migration rate of lithium ions in these micropores is fast, such that the composite solid electrolyte sheet has a high room temperature conductivity. In addition, when the electrolyte polymer is preferably one or a mixture of more of PAA, PVDF, PVDF-HFP and PMMA, the lithium battery correspondingly prepared has a more excellent conductivity.

Furthermore, in the solid electrolyte core layer, the electrolyte additive is one or a mixture of more of stearic acid, a stearate, paraffin, siloxane, metal soap, dibutyl phthalate, dioctyl phthalate, cyclohexane and a sulfonate.

Stearic acid, stearate, paraffin, siloxane, metal soap, dibutyl phthalate, dioctyl phthalate, cyclohexane and sulfonate are all used as lubricants, can reduce friction between the inorganic solid electrolyte and the electrolyte polymer, and facilitate the extrusion molding of the solid electrolyte core layer.

Furthermore, in the first buffer adhesive layer and the second buffer adhesive layer, the weight ratio of the buffer adhesive layer lithium salt to the buffer adhesive layer additive is 5-15:1-10, and the weight of the buffer adhesive layer inorganic solid electrolyte accounts for 20%-60% of the weight of the first buffer adhesive layer or the second buffer adhesive layer.

In a case that the performances such as a battery performance and a safety performance of a lithium battery are comprehensively considered, when the weight ratio of the buffer adhesive layer lithium salt to the buffer adhesive layer additive is 5-15:1-10, and the weight of the buffer adhesive layer inorganic solid electrolyte accounts for 20%-60% of the weight of the first buffer adhesive layer or the second buffer adhesive layer in the buffer adhesive layer, the lithium battery correspondingly prepared is optimal.

In such a case the buffer adhesive layer inorganic solid electrolyte in the present invention mainly replenishes lithium ions for the lithium battery such that the lithium battery has a good cycle life, and therefore, whether the material of the buffer adhesive layer inorganic electrolyte is consistent with the material of the core layer inorganic solid electrolyte, and it can be the same or different with respect to the core layer inorganic solid electrolyte when in use.

Furthermore, in the first buffer adhesive layer and the second buffer adhesive layer, the buffer adhesive layer lithium salt comprises one or a mixture of more of $LiClO_4$, $LiAsF_6$, $LiBF_4$, $LiPF_6$, $LiCF_3SO_3$, LiTFSI, $LiC(CF_3SO_2)_3$, and LiBOB.

Lithium perchlorate ($LiClO_4$), lithium hexafluoroarsenate ($LiAsF_6$), lithium tetrafluoroborate ($LiBF_4$), lithium hexafluorophosphate ($LiPF_6$), lithium trifluoromethanesulfonate ($LiCF_3SO_3$), lithium bis(trifluoromethanesulfonate)imide (LiTFSI), tris(trifluoromethanesulfonate) methyl lithium ($LiC(CF_3SO_2)_3$) and lithium bisoxalate borate (LiBOB) all are lithium salts containing acid radical ions, can rapidly produce lithium ions by ionization, and replenish lithium ions when they are insufficient in a lithium battery, and furthermore, the acid radical ions produced therefrom are unstable and can be combined with lithium ions when the lithium ions are excess in the lithium battery, thereby providing a dynamic balance system for the lithium battery, and improving the electric cycle performance of the lithium battery.

Furthermore, in the first buffer adhesive layer and the second buffer adhesive layer, the buffer adhesive layer additive is one or a mixture of more of PEO, polysiloxane, PPC, PEC, PTMC, VC, a fluoromethyl carbonate, and a fluoroethyl carbonate.

According to the technical solution described above, polyethylene oxide (PEO), polysiloxane, polypropylene carbonate (PPC), polyethylene carbonate (PEC), polytrimethylene carbonate (PTMC), vinylene carbonate (VC), fluoromethyl carbonate and fluoroethyl carbonate are all high-molecular polymers, which can not only have a good supporting function, but also be better compatible with the electrolyte polymer in the solid electrolyte core layer, thereby increasing the bonding firmness between the solid electrolyte core layer and the buffer adhesive layer.

Furthermore, the preparation method of the lithium battery comprises the following operation steps:

(1) Preparation of a Buffer Adhesive formulating a buffer adhesive for forming a first buffer adhesive layer and a second buffer adhesive layer, specifically involving: dissolving a buffer adhesive layer additive and a buffer adhesive layer lithium salt in a solvent, then adding a buffer adhesive layer inorganic solid electrolyte, and mixing and dispersing same to obtain the corresponding buffer adhesive;

(2) Preparation of a Solid Electrolyte Masterbatch Adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and (3) Coextrusion and Forming injecting the buffer adhesive prepared in step (1) and the solid electrolyte masterbatch adhesive prepared in step (2) in set structures into the specified part of an extruder, one-time extruding same by means of a coextrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

According to the technical solution described above, the solvent in the present invention can be one or a mixed solvent of propylene carbonate, ethylene carbonate, diethyl carbonate, dimethyl carbonate, acetonitrile, water, and N-methylpyrrolidone, but is not limited to these solvents disclosed above, in order to promote the uniform dispersion of the buffer adhesive layer additive, the buffer adhesive layer lithium salt, and the buffer adhesive layer solid electrolyte. The electrolyte polymer dispersed in the core layer inorganic solid electrolyte will be melt to a certain extent during the heating in the extruder, and in turn bond and fix the core layer inorganic solid electrolyte.

Subsequently, the buffer adhesive and the solid electrolyte masterbatch adhesive are one-time extruded, the extruded composite solid electrolyte sheet is one-time sheet pressed and formed with a positive electrode plate and a negative electrode plate, and then the lithium battery is subjected to a liquid injection by using a liquid electrolyte, thereby effectively reducing the internal interface resistance of the lithium battery. Compared with the traditional operation involving coating the buffer adhesive and solid electrolyte adhesive onto the positive electrode plate or negative electrode plate layer by layer, the method of the invention effectively reduces the preparation steps of a lithium battery, effectively improves the production efficiency of the lithium battery, and reduce the production cost thereof to a certain extent.

The liquid electrolyte in the present invention is preferably one or a mixture of more of an imidazole ionic liquid, a pyrrole ionic liquid, and a short-chain fatty quaternary ammonium salt ionic liquid, and more preferably, the liquid electrolyte is one or a mixture of more of 1-ethyl-3-methylimidazolium fluoride ($EMIF_{2.3}HF$), 1-butyl-3-methylimidazolium hexafluorophosphate ($BMIPF_6$), N-methylbutylpyrrolidinium bis(trifluoromethylsulfonyl)imide ($PyR_{14}TFSI$), and N,N-dimethyl-N-ethyl-N-2-methoxyethylammonium bis(trifluoromethylsulfonyl)imide ($DEMENTf_2$), but is not limited to these disclosed above, in order to reduce the interface resistance between the positive electrode plate, the negative electrode plate and the composite solid electrolyte sheet.

In summary, the present invention has the following beneficial effects:

1. The lithium battery of the present invention is configured by the structure of a positive electrode plate, a buffer adhesive layer, a solid electrolyte core layer, a buffer adhesive layer, and a negative electrode plate, wherein the arrangement of a separator is omitted, and even if the solid electrolyte core layer is ruptured caused by puncturing or impacting of foreign objects such as a steel needle, the solid electrolyte core layer will shorten and even restore the ruptured gap under the action of the internal electrolyte polymer, so as to maintain the original excellent isolation effect, and allow the lithium battery to have a good mechanical strength, and relatively high electrical cycle performance and safety performance.

2. For the lithium battery of the present invention, by combining coextrusion technology and rolling technology, one-time processing and forming is achieved, the preparation steps of the lithium battery is reduced, the production efficiency of the lithium battery is effectively improved, and the production cost thereof is reduced to a certain extent, and the method has a characteristic of a simple and convenient operation.

DETAILED DESCRIPTION OF EMBODIMENTS

Figure 1:
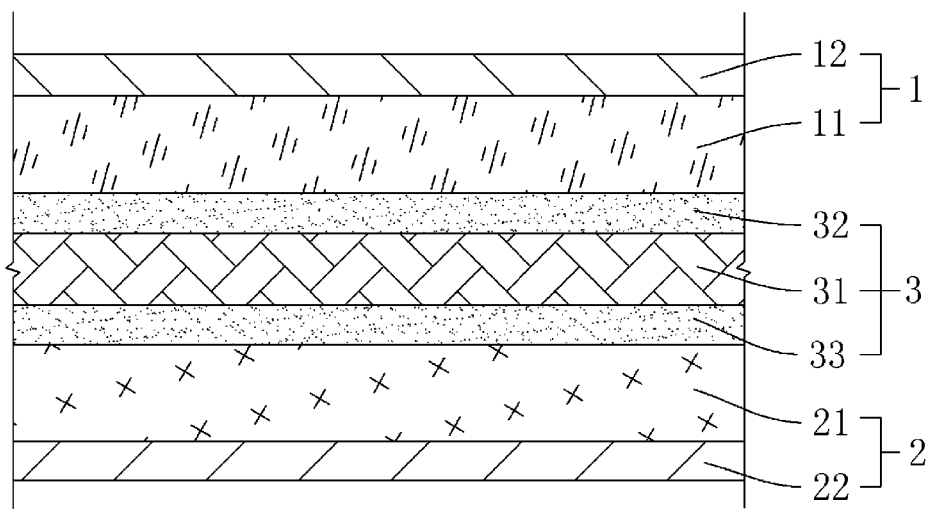
FIG. 1 is a schematic diagram of the internal structure of a hybrid solid-liquid electrolyte lithium battery.

The present invention will be further detailed below combined with the drawing.
Referring to FIG. 1, this figure shows a hybrid solid-liquid electrolyte lithium battery disclosed in the present invention, comprising a positive electrode plate 1, a negative electrode plate 2, and a composite solid electrolyte sheet 3 arranged between the positive electrode plate 1 and the negative electrode plate 2. The composite solid electrolyte sheet 3 comprises a solid electrolyte core layer 31, a first buffer adhesive layer 32 arranged on the solid electrolyte core layer 31 at the side facing the positive electrode plate 1, and a second buffer adhesive layer 33 arranged on the solid electrolyte core layer 31 at the side facing the negative electrode plate 2.
In such a case the positive electrode plate 1 in the present invention includes a positive electrode material layer 11 and a positive electrode supporting layer 12. The positive electrode material layer 11 is bonded to the first buffer adhesive layer 32, and includes a positive electrode active material, a conducting agent, PEO, a lithium salt, and PVDF. In the present invention, the negative electrode plate 2 includes a negative electrode material layer 21 and a negative electrode supporting layer 22. The negative electrode material layer 21 is bonded to the second buffer adhesive layer 33, and the negative electrode material layer 21 includes a negative electrode active material, a conducting agent, a pasting agent, and a binder.
The solid electrolyte core layer 31 is mainly formed by mixing a core layer of an inorganic solid electrolyte, an electrolyte polymer and an electrolyte additive. The first buffer adhesive layer 32 and the second buffer adhesive layer 33 both include one or a mixture of more of an inorganic solid electrolyte, and a lithium salt and an additive The preparation method of the present invention will be further detailed below in combination with specific examples.

Example 1

Figure 2:
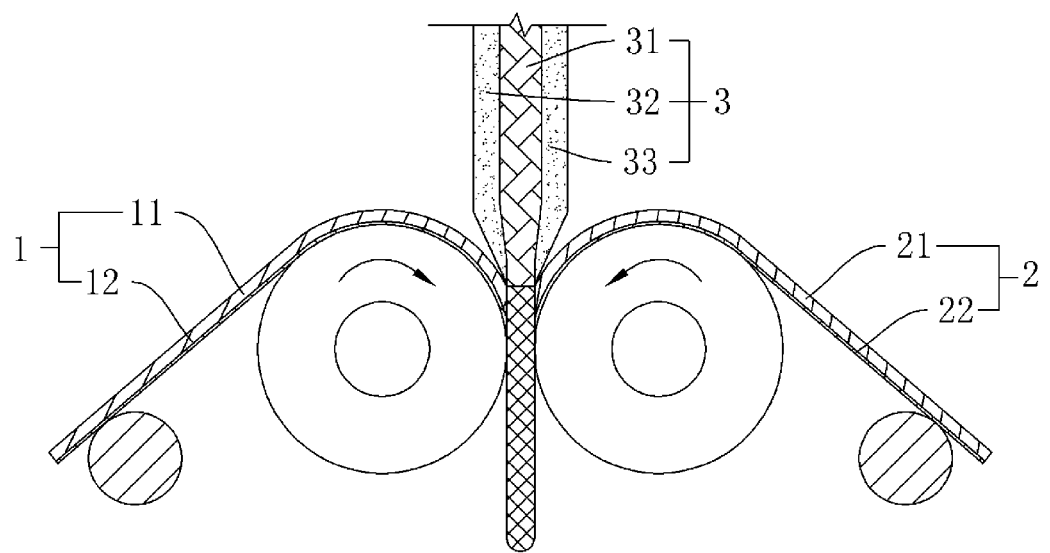
FIG. 2 is a simple structural schematic diagram of preparation, by extrusion of a sheet for preparing a hybrid solid-liquid electrolyte lithium battery.

Referring to FIG. 2, the figure shows a method for preparing a hybrid solid-liquid electrolyte lithium battery, including the following operation steps:
(1) Preparation of a Buffer Adhesive
a buffer adhesive for forming a first buffer adhesive layer 32 and a second buffer adhesive layer 33 is formulated, wherein the composition of the first buffer adhesive layer 32 and the second buffer adhesive layer 33 are the same, and specifically: 5 g of a buffer adhesive layer lithium salt LiTFSI and 1 g of buffer adhesive layer additive PEO are weighted at a weight ratio of 5:1, and the two are dissolved in 114 g of acetonitrile to form an organic polymer electrolyte adhesive with a solid content of 5%, then buffer adhesive layer inorganic solid electrolyte LLTO is added, mixed and dispersed into the corresponding buffer adhesive, wherein the weight of the buffer adhesive layer inorganic solid electrolyte accounts for 40% of the weight of the corresponding electrolyte buffer adhesive, respectively.
(2) Preparation of a Solid Electrolyte Masterbatch Adhesive
A core layer inorganic solid electrolyte LLTO, an electrolyte polymer PVDF, an electrolyte additive DBP are weighted at a weight ratio of 80:10:10, the core layer inorganic solid electrolyte LLTO is first mixed with the electrolyte polymer PVDF to make a masterbatch, then the masterbatch and 3 wt % of the electrolyte additive DBP are added into a twin-screw extruder, and same is heated and mixed by means of the twin-screw extruder to obtain the solid electrolyte masterbatch adhesive.
(3) Preparation of Positive Electrode Plate 1
(3)-1. A positive electrode active material, a conductive agent carbon black, polyethylene oxide, lithium salt LiTFSI, and polyvinylidene fluoride are successively weighed at a weight ratio of 80:1:12:2:1, wherein the positive electrode active material is a ternary material, and the mixture is for later use.
(3)-2. The positive electrode active material $LiCoAnO_2$, a conductive agent of carbon black, PEO, lithium salt LiTFSLPVDF and N-methylpyrrolidone are mixed in N-methylpyrrolidone as a solvent, and the mixture is stirred into a uniform positive electrode slurry with a solid content of 50%, which is used to form the positive electrode material layer 11.
(3)-3. The positive electrode slurry obtained in step (3)-2 is coated on the positive electrode supporting layer 12 of aluminum foil with a thickness of 10 μm, and same is dried, rolled and cut at a temperature of 120° C. and an operating speed of 1.0 m/min, to prepare positive electrode plate 1.
(4) Preparation of Negative Electrode Plate 2
(4)-1. A negative electrode active material of graphite, acetylene black, sodium carboxymethyl cellulose and PVDF are successively weighed at a weight ratio of 90:1:1:3, and the mixture is for later use.
(4)-2. A negative electrode active material graphite, acetylene black, sodium carboxymethyl cellulose and PVDF are mixed in water as a solvent, and the mixture is stirred into an uniform negative electrode slurry with a solid content of 60%, which is used to form the negative electrode material layer 21.

(4)-3. The negative electrode slurry obtained in step (4)-2 is coated on a 10 μm of a negative electrode supporting layer 22 of a copper foil, and same is dried, rolled and cut at a temperature of 90° C., and an operating speed of 1.0 m/min to prepare the negative electrode plate 2.

(5) Coextrusion and Forming

The buffer adhesive prepared in step (1) and the solid electrolyte masterbatch adhesive prepared in step (2) in set structures are injected into the specified part of an extruder, same are one-time extruded by means of a coextrusion technology, and the solvent is evaporated to dryness at a temperature to 80° C., to give the composite solid electrolyte sheet 3, then the composite solid electrolyte sheet 3 is fed into a roller press together with the positive electrode plate 1 prepared in step (3) and the negative electrode plate 2 prepared in step (4), same is one-time sheet pressed and formed a sheet by means of a hot pressing lamination process, the solvent is evaporated to dryness at a temperature of 90° C., a sufficient amount of liquid electrolyte EMIF2.3HF is injected for a liquid injection process, followed by an existing battery preparation process to make the final hybrid solid-liquid electrolyte lithium battery, in which the weight ratio of the first buffer adhesive layer (32), the solid electrolyte core layer (31) to the second buffer adhesive layer (33) is 15:70:15, and the thickness ratio is 20:60:20.

Example 2

The differences between this example and example 1 lie in that in the preparation of a buffer adhesive, the buffer adhesive layer additive is PEO, the buffer adhesive layer lithium salt is added only in second buffer adhesive layer 33, the buffer adhesive layer lithium salt is LiTFSI, 5 g of the buffer adhesive layer lithium salt LiTFSI and 10 g of the buffer adhesive layer additive PEO are weighed at a weight ratio of 5:10 and dissolved in acetonitrile to form an organic polymer electrolyte adhesive with a solid content of 10%, and the buffer adhesive layer inorganic solid electrolyte is LAGP, and in the formed electrolyte buffer adhesive, the weight of the buffer adhesive layer inorganic solid electrolyte accounts for 60% of the weight of the corresponding electrolyte buffer adhesive, respectively.

In the preparation of a solid electrolyte masterbatch adhesive, the core layer inorganic solid electrolyte is LAGP, the electrolyte polymer is PAA, the electrolyte additive is stearic acid, and the weight ratio of the core layer inorganic solid electrolyte is LAGP, the electrolyte polymer PAA to the electrolyte additive stearic acid is 40:50:1.

In the preparation of a positive electrode plate 1, a positive electrode active material, a conductive agent of carbon black, polyethylene oxide, lithium salt LiTFSI and polyvinylidene fluoride are successively weighed at a weight ratio of 90:5:5:10:5, wherein the positive electrode active material is lithium cobaltate, the temperature is 110° C., and the operating speed is 0.5 m/min.

In the preparation of a negative electrode plate 2, a negative electrode active material of graphite, acetylene black, sodium carboxymethyl cellulose and PVDF are successively weighed at a weight ratio of 95:3:2:2, wherein the negative electrode active material is a silicon carbon composite, the temperature is 130° C., and the operating speed is 20 m/min.

The liquid electrolyte injected during the liquid injection is BMIPF6.

In the prepared hybrid solid-liquid electrolyte lithium battery, the weight ratio of the first buffer adhesive layer (32), the solid electrolyte core layer (31) to the second buffer adhesive layer (33) is 5:85:10, and the thickness ratio is 5:80:15.

Example 3

The differences between this example and example 1 lie in that in the preparation of a buffer adhesive, the buffer adhesive layer additive is PEC, the buffer adhesive layer lithium salt is LiBOB, 10 g of the buffer adhesive layer lithium salt LiBOB and the buffer adhesive layer additive PEC are weighed at a weight ratio of 1:1 and dissolved in water to form an organic polymer electrolyte adhesive with a solid content of 10%, and the buffer adhesive layer inorganic solid electrolyte is LATP, and in the formed electrolyte buffer adhesive, the weight of the buffer adhesive layer inorganic solid electrolyte accounts for 20% of the weight of the corresponding electrolyte buffer adhesive, respectively.

In the preparation of a solid electrolyte masterbatch adhesive, the core layer inorganic solid electrolyte is a mixture of LATP and LLTO with a weight ratio of 1:1, the electrolyte polymer is PMMA, the electrolyte additive is paraffin, and the weight ratio of the core layer inorganic solid electrolyte is LATP, and the weight ratio of the electrolyte polymer PMMA to the electrolyte additive of paraffin is 89:30:5.

In the preparation of a positive electrode plate 1, a positive electrode active material, a conductive agent of carbon black, polyethylene oxide, lithium salt LiTFSI and polyvinylidene fluoride are successively weighed at a weight ratio of 85:5:10:5:2, wherein the positive electrode active material is lithium iron phosphate, the temperature is 150° C., and the operating speed is 10.0 m/min.

In the preparation of a negative electrode plate 2, a negative electrode active material of graphite, acetylene black, sodium carboxymethyl cellulose and PVDF are successively weighed at a weight ratio of 90:2:2:3, wherein the negative electrode active material is metal lithium, the temperature is 100° C., and the operating speed is 0.5 m/min.

The liquid electrolyte injected during the liquid injection is $PyR_{14}TFSI$.

In the prepared hybrid solid-liquid electrolyte lithium battery, the weight ratio of the first buffer adhesive layer (32), the solid electrolyte core layer (31) to the second buffer adhesive layer (33) is 70:25:5, and the thickness ratio is 30:50:20.

Example 4

The differences between this example and example 1 lie in that in the preparation of a buffer adhesive, the buffer adhesive layer additive is PTMC, the buffer adhesive layer lithium salt is $LiPF_6$, and the buffer adhesive layer inorganic solid electrolyte is $Li_2S$—$P_2S_5$, and in the formed electrolyte buffer adhesive, the weight of the buffer adhesive layer inorganic solid electrolyte accounts for 20% of the weight of the corresponding electrolyte buffer adhesive.

In the preparation of a solid electrolyte masterbatch adhesive, the core layer inorganic solid electrolyte is $Li_3N$.

The liquid electrolyte injected during the liquid injection is $DEMENTf_2$.

In the prepared hybrid solid-liquid electrolyte lithium battery, the weight ratio of the first buffer adhesive layer (32), the solid electrolyte core layer (31) and the second buffer adhesive layer (33) is 40:30:40, and the thickness ratio is 30:40:30.

Example 5

The differences between this example and example 1 lie in that in the preparation of a buffer adhesive, the buffer adhesive layer additive is PPC, the buffer adhesive layer lithium salt is $LiBF_4$, 15 g of the buffer adhesive layer lithium salt $LiBF_4$ and the buffer adhesive layer additive PPC are weighed at a weight ratio of 15:1 and dissolved in water to form an organic polymer electrolyte adhesive with a solid content of 12%, the buffer adhesive layer inorganic solid electrolyte is $Li_2S$—$SiS_2$, the electrolyte polymer is PVDF-HFP and the electrolyte additive is DOP; and in the preparation of a solid electrolyte masterbatch adhesive, the core layer inorganic solid electrolyte is a mixture of LLTO and $Li_3P(S_{0.5}O_{0.5})4$ at a weight ratio of 1:2.

In the preparation of a positive electrode plate 1, the positive electrode active material is a lithium-rich manganese-based material, the temperature is 130° C., and the operating speed is 10.0 m/min.

In the preparation of the negative electrode plate 2, the negative electrode active material is a nano-silicon material, the temperature is 100° C., and the operating speed is 0.5 m/min.

In the prepared hybrid solid-liquid electrolyte lithium battery, the thickness ratio of the first buffer adhesive layer (32), the solid electrolyte core layer (31) and the second buffer adhesive layer (33) is 10:85:5.

Example 6

The differences between this example and example 1 lie in that in the preparation of a buffer adhesive, the buffer adhesive layer additive is VC, the buffer adhesive layer lithium salt is $LiCF_3SO_3$, and the buffer adhesive layer inorganic solid electrolyte is $Li_3N$, and In the preparation of a solid electrolyte masterbatch adhesive, the core layer inorganic solid electrolyte is LiPON.

In the preparation of a positive electrode plate 1, the positive electrode active material is a composite of a ternary material covered with or physically mixed with a solid electrolyte, the temperature is 120° C., and the operating speed is 10.0 m/min.

Example 7

The difference between this example and example 1 lies in that the thickness ratio of the first buffer adhesive layer (32), the solid electrolyte core layer (31) to the second buffer adhesive layer (33) is 15:83:2.

Example 8

The difference between this example and example 1 lies in that in the preparation of a solid electrolyte masterbatch adhesive, the weight ratio of the core layer inorganic solid electrolyte LLTO, the electrolyte polymer PVDF to the electrolyte additive DBP is 90:5:5.

Example 9

The difference between this example and example 1 lies in that in the preparation of a buffer adhesive, the buffer adhesive layer lithium salt LiTFSI to the buffer adhesive layer additive PEO is dissolved in acetonitrile at a weight ratio of 20:1.

Example 10

The difference between this example and example 1 lies in that in the preparation of a buffer adhesive, the weight of the buffer adhesive layer inorganic solid electrolyte accounts for 10% of the weight of the corresponding electrolyte buffer adhesive.

Example 11

The difference between this example and example 1 lies in that the positive electrode sheet 1, the negative electrode sheet 2 and the composite solid electrolyte sheet 3 are prepared into the corresponding lithium battery by means of a traditional lamination process.

Example 12

The differences between this example and example 1 lie in that the first solid electrolyte masterbatch adhesive is extruded to prepare a solid electrolyte core layer 31, then the buffer adhesive is applied on both sides of the solid electrolyte core layer 31 to form correspondingly a first buffer adhesive layer 32 and a second buffer adhesive layer 33, and the solvent is dried at a temperature to 80° C. to prepare a composite electrolyte core layer 3, and finally the composite electrolyte core layer 3 is fed into a roller press together with the positive electrode plate 1 and the negative electrode plate 2, same is one-time sheet pressed and formed into a sheet by means of a hot pressing lamination process, and the solvent is evaporated to dryness at a temperature of 90° C., to prepare the corresponding lithium battery.

Comparative Example 1

The difference between this comparative example and example 1 lies in that the composite solid electrolyte sheet 3 does not contain the first buffer adhesive layer 32 and the second buffer adhesive layer 33.

Comparative Example 2

The differences between this comparative example and example 1 lie in that the composite solid electrolyte sheet 3 comprises only a solid electrolyte core layer 31 and a second buffer adhesive layer 33.

Comparative Example 3

The differences between this comparative example and example 1 lie in that the composite solid electrolyte sheet 3 comprises only a solid electrolyte core layer 31 and a first buffer adhesive layer 32.

Comparative Example 4

The differences between this comparative example and example 1 lie in that no electrolyte polymer is added in the solid electrolyte core layer 31.

Comparative Example 5

The differences between this comparative example and example 1 lie in that no electrolyte polymer is added in the solid electrolyte core layer 31, and a PP separator layer is also arranged between the solid electrolyte core layer 31 and the first buffer adhesive layer 32.

Comparative Example 6

Comparative example 6 is the lithium ion battery of example 4 disclosed in the Chinese Invention Patent Application No. 201611112927.X.

The following performance tests are performed on the lithium batteries prepared in examples 1-12 and comparative examples 1-6, and the test results are shown in Table 1.

1. Test experiment of the proportion of specific capacity exertion to theoretical specific capacity. It means the first charge-discharge experiment: The specific capacity exertion of the present invention is display in a specific reading of the equipment during the production, including the sum of the normal formation capacity and the capacity grading capacity, and the proportion of the specific capacity exertion to the theoretical specific capacity is calculated by the following formula: [(normal formation capacity+capacity grading capacity)/theoretical specific capacity]×100%.

2. Test experiment of cycle life performance: Under 1 C/4.2V of a constant current/a constant voltage conditions (room temperature 60° C.), for each battery, current charging is cut-off at 1 C/4.2V and discharging is cut-off at 1 C/3.0V, and the number of cycles is counted when the capacity retention rate is 80% and more.

3. Test experiment of internal resistance: The internal resistance of the present invention is tested by using alternating-current impedance at Zahner Electrochemical Workstation, Germany; with a test system of a U-Buffer two-electrode system, the test frequency range from 0.01 Hz-100 KHz, and the amplitude of 5 mV.

4. Test experiment of battery short-circuit rate: Measurement is performed according to the standard of GB/T 31485-2015.

5. Test experiment of nail penetration pass rate: Measurement is performed according to the standard of GB/T 31485-2015, with a probe having a diameter of 5 mm.

theoretical specific capacity of higher than 90.2%, a cycle life of 1210 or more, an internal resistance of 26.7-37.2 mΩ, a battery short-circuit rate of less than 0.3% and a nail penetration pass rate of higher than 95.7%. When the various performances are comprehensively considered, lithium batteries of these six examples have little difference in performance, and all have excellent electric cycle performance and safety performance. In examples 7 to 12, the lithium battery has a proportion of the specific capacity exertion of the lithium batteries to theoretical specific capacity of 85.1%-90.3%, a cycle life of 1130-1279, an internal resistance of 31.9-45.7 mΩ, a battery short-circuit rate of 0.4%-2.8% and a nail penetration pass rate of 85.7%-98.1%. When the various performances are comprehensively considered, the comprehensive performance of the lithium batteries prepared in examples 1 to 6 is better than that in examples 7 to 12.

In example 1, the composition of the first buffer adhesive layer and the second buffer adhesive layer is the same, whereas in example 2, the buffer adhesive layer lithium salt is removed from the first buffer layer, which verifies that the composition of the two buffer adhesive layers can be the same or different, and the first buffer adhesive layer or the second buffer adhesive layer can include one or a mixture of more of the buffer adhesive layer inorganic solid electrolyte, the buffer adhesive layer lithium salt, and the buffer adhesive layer additive.

The core layer inorganic solid electrolyte in example 1 is LLTO, which is representative of an oxide solid electrolyte, LAGP in example 2 is representative of a sulphide solid electrolyte, LATP and LLTO in example 3 are representative of a sulphide solid electrolyte mixed with an oxide solid electrolyte, $Li_3N$ in example 4 is representative of a nitride solid electrolyte, and LLTO and $Li_3P(S_{0.5}O_{0.5})_4$ in example 5 are representative of an oxide solid state electrolyte mixed with a nitride solid state electrolyte. It can thus be demonstrated that the core layer inorganic solid electrolyte can be is one or a mixture of more of an oxide solid electrolyte, a sulfide solid electrolyte, and a nitride solid electrolyte.

TABLE 1

| | The proportion of specific capacity play to theoretical specific capacity (%, 25° C.) | Cycle life (times, 60° C., 1C/1C) | Internal resistance (mΩ), 25° C.) | Battery short-circuit rate (%) | Nail penetration pass rate (%) |
|---|---|---|---|---|---|
| Example 1 | 99.1 | 1320 | 30.7 | 0 | 100.0 |
| Example 2 | 90.2 | 1310 | 29.4 | 0.2 | 99.1 |
| Example 3 | 91.3 | 1380 | 26.7 | 0.3 | 96.4 |
| Example 4 | 94.7 | 1290 | 37.4 | 0.1 | 95.7 |
| Example 5 | 92.7 | 1300 | 31.4 | 0 | 100.0 |
| Example 6 | 90.6 | 1210 | 34.2 | 0.1 | 98.5 |
| Example 8 | 90.8 | 1180 | 30.8 | 0.2 | 89.5 |
| Example 7 | 87.4 | 1250 | 41.2 | 0.4 | 98.1 |
| Example 9 | 85.1 | 1196 | 33.5 | 0.8 | 96.7 |
| Example 10 | 87.9 | 1279 | 41.8 | 2.8 | 91.5 |
| Example 11 | 90.3 | 1208 | 45.7 | 1.7 | 85.7 |
| Example 12 | 88.1 | 1130 | 38.9 | 0.6 | 95.7 |
| Comparative example 1 | 73.9 | 725 | 44.1 | 10.1 | 77.2 |
| Comparative example 2 | 76.8 | 864 | 44.7 | 4.3 | 89.4 |
| Comparative example 3 | 83.4 | 1180 | 46.2 | 5.2 | 89.5 |
| Comparative example 4 | 43.5 | 214 | 10.8 | 44.7 | 68.9 |
| Comparative example 5 | 93.0 | 708 | 45.7 | 10.7 | 78.5 |
| Comparative example 6 | 99.0 | 1280 | 45.0 | 0 | 72.9 |

Result Analysis

In examples 1 to 6, the lithium battery has a proportion of the specific capacity exertion of the lithium batteries to Examples 1 to 4 and example 7 all define the thickness ratio of the first buffer adhesive layer, the solid electrolyte core layer to the second buffer adhesive layer, and it can be seen from the corresponding test results that when the thickness ratio is (5-30):(40-90):(5-30), the performance of the lithium battery prepared therefrom is better than that of the lithium battery that does not fall within the thickness ratio.

Examples 1 to 4 and example 8 define the weight ratio of the core layer inorganic solid electrolyte, the electrolyte polymer, to the electrolyte additive, and it can be seen from the corresponding test results that when the weight ratio is (40-89):(10-50):(1-10), the performance of the lithium battery prepared therefrom is better than that of the lithium battery that does not fall within the weight ratio.

Examples 1 to 4 and example 9 define the weight ratio of the buffer adhesive layer lithium salt to the buffer adhesive layer additive, and it can be seen from the corresponding test results that when the weight ratio is (5-15):(1-10), the performance of the lithium battery prepared therefrom is better than that of the lithium battery that does not fall within the weight ratio.

Examples 1 to 4 and example 10 define the ratio of the weight of the buffer adhesive layer inorganic solid electrolyte to the weight of the corresponding electrolyte buffer adhesive, and it can be seen from the corresponding test results that when the weight ratio is 20%-60%, the performance of the lithium battery prepared therefrom is better than that of a lithium battery that does not fall within the weight ratio.

Example 1, example 11 and example 12 all define a preparation method of the lithium battery, and it can be seen from the corresponding test results that when the lithium battery is prepared by using coextrusion technology and one-time sheet pressing and forming method, the electrical cycling performance and safety performance of the lithium battery can be effectively improved, while ensuring an excellent room temperature conductivity of the lithium battery.

Figure 3:
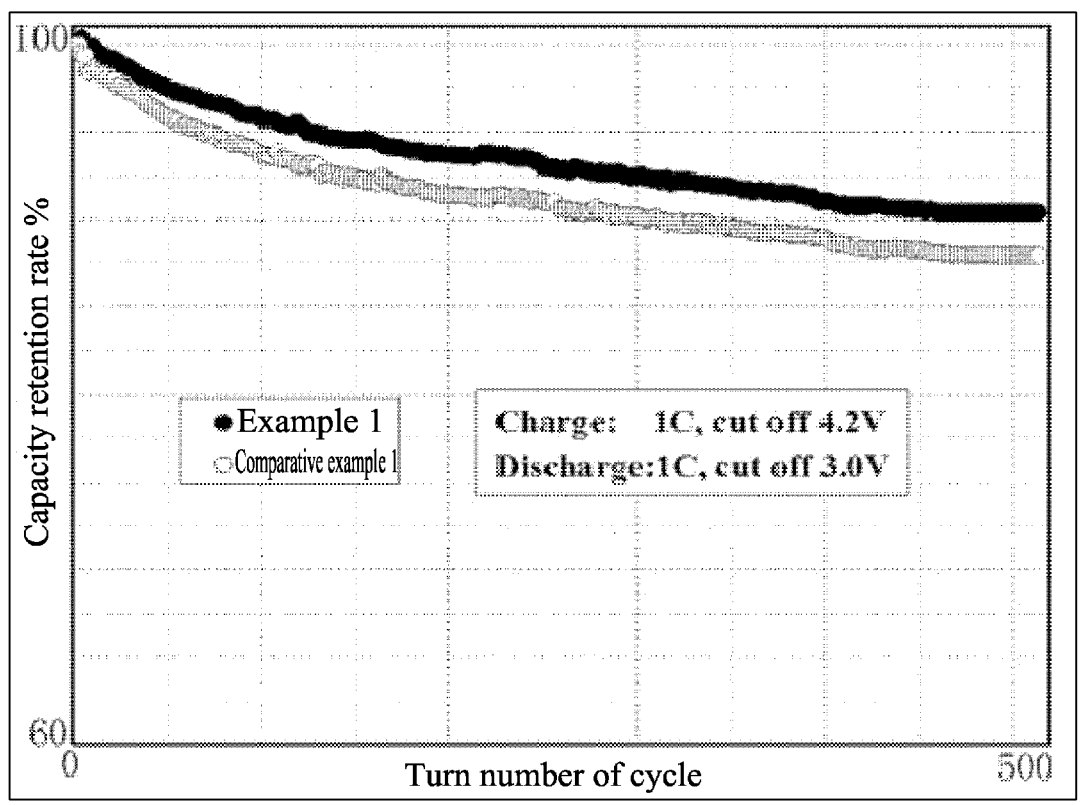
FIG. 3 is a detection profile of the capacity retention rates of example 1 and comparative example 1.
Figure 4:
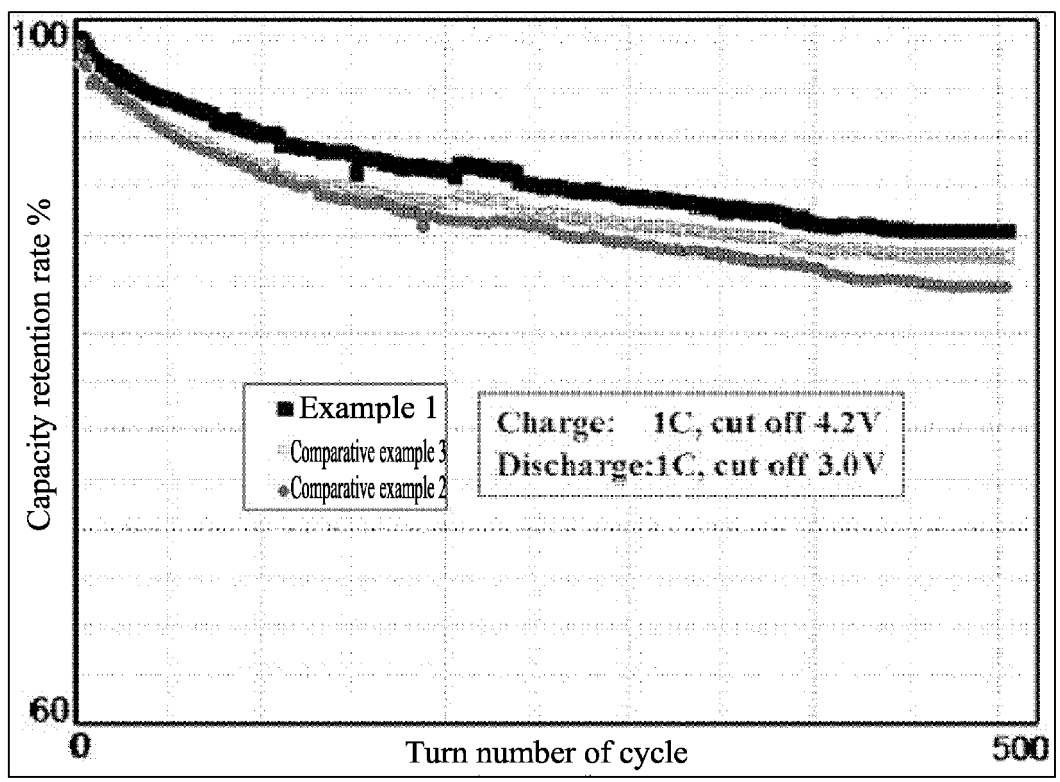
FIG. 4 is a detection profile of the capacity retention rates of example 1, comparative example 2 and comparative example 3.
In the figures, 1. positive electrode plate; 11. positive electrode material layer; 12. positive electrode supporting layer; 2. negative electrode plate; 21. negative electrode material layer; 22. negative electrode supporting layer; 3. composite solid electrolyte sheet; 31. solid electrolyte core layer; 32. first buffer adhesive layer; 33. second buffer adhesive layer.

With regard to comparative examples 1 to 3, on the basis of example 1, adjustments can be made to the arrangement of the first buffer adhesive layer and the second buffer adhesive layer, respectively, and it can be seen from the corresponding test results that although comparative example 2 has a nail penetration pass rate of higher than 90%, and has a good safety performance, but the proportion of the specific capacity exertion to the theoretical specific capacity and the cycle life thereof are low. In addition, applicants have also took lithium batteries of example 1 and comparative examples 1-3 for the determination of capacity retention rate, and the specific test results are shown in FIGS. 3 and 4 that the capacity retention ratio of example 1 is significantly higher than that of comparative example 1 and comparative example 2, and slightly higher than that of comparative example 3. Then, it can be obtained in combination with the test results in Table 1 that the arrangements of a first buffer adhesive layer 32 and a second buffer adhesive layer 33 in the lithium battery of the present invention can effectively improve the capacity retention rate of the lithium battery, and the first buffer adhesive layer 32 has a positive effect on the capacity retention rate significantly greater than that of the second buffer adhesive layer 33, and thereby, it can be obtained that the arrangements of both the first buffer adhesive layer 32 and the second buffer adhesive layer 33 can effectively improve the electric cycle performance of the lithium battery.

With regard to comparative examples 4 and 5, on the basis of example 1, adjustments can be made to the components of the solid electrolyte core layer 31, and it can be seen from the corresponding test results that when the solid electrolyte core layer 31 is not added with an electrolyte polymer or the electrolyte polymer is replaced with a PP separator layer, and the electric cycle performance and safety performance of the lithium battery prepared therefrom will be significantly reduced.

Comparative example 6 is an existing lithium ion battery with a separator, and by comparing the test results thereof with the test results of example 1, it can be seen that the electric cycle performance of the invention has a smaller difference with that of comparative example 6, and the nail penetration pass rate is significantly better than that of comparative example 6. so the present invention has a more excellent safety performance.

In summary, the lithium battery prepared by the present invention has excellent electric cycle performance and safety performance, and the preparation method therefor has a high production efficiency and a simple and convenient operation.

The specific embodiments are merely an explanation of the present invention, and is not a limitation of the present invention. After reading this specification, a person skilled in the art may make modifications to these examples without creative contribution according to needs, and they are protected by patent law as long as they are within the scope of the claims of the invention.

What is claimed is:

1. A hybrid solid-liquid electrolyte lithium battery, comprising a positive electrode plate, a negative electrode plate, and a composite solid electrolyte sheet arranged between the positive electrode plate and the negative electrode plate, wherein the composite solid electrolyte sheet comprises a solid electrolyte core layer, a first buffer adhesive layer arranged on the solid electrolyte core layer at a first side facing the positive electrode plate and a second buffer adhesive layer arranged on the solid electrolyte core layer at a second side facing the negative electrode plate, wherein the solid electrolyte core layer is formed by mixing a core layer inorganic solid electrolyte, an electrolyte polymer and an electrolyte additive, the first buffer adhesive layer and the second buffer adhesive layer comprise one or a mixture of more of a buffer adhesive layer inorganic solid electrolyte, a buffer adhesive layer lithium salt and a buffer adhesive layer additive, and a weight of the first buffer adhesive layer or the second buffer adhesive layer accounts for 5%-70% of a weight of the composite solid electrolyte sheet, and wherein the solid electrolyte core layer does not include a buffer adhesive layer lithium salt.

2. The hybrid solid-liquid electrolyte lithium battery according to claim 1, wherein a thickness ratio of the first buffer adhesive layer, to the solid electrolyte core layer to the second buffer adhesive layer is (5-30):(40-90):(5-30).

3. The hybrid solid-liquid electrolyte lithium battery according to claim 2, wherein the preparation method of the lithium battery comprises the following steps:
(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;
(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and (3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

4. The hybrid solid-liquid electrolyte lithium battery according to claim 1, wherein in the solid electrolyte core layer, a weight ratio of the core layer inorganic solid electrolyte, the electrolyte polymer and the electrolyte additive is (40-89):(10-50):(1-10).

5. The hybrid solid-liquid electrolyte lithium battery according to claim 4, wherein the preparation method of the lithium battery comprises the following steps:

(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;

(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and (3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

6. The hybrid solid-liquid electrolyte lithium battery according to claim 1, wherein in the solid electrolyte core layer, the core layer inorganic solid electrolyte is one or a mixture of more of an oxide solid electrolyte, a sulfide solid electrolyte, and a nitride solid electrolyte; and the oxide solid electrolyte is one or a mixture of more of a garnet solid electrolyte material, a NASICON solid electrolyte material, a LISICON solid electrolyte material, and a perovskite solid electrolyte material; and the sulfide solid electrolyte is one or a mixture of more of crystalline or amorphous $Li_2S-P_2S_5$, crystalline $LiAMS_4$, crystalline $Li_{10}NP_2S_{12}$, $Li_2S$, $Li_3PS_4$, $Li_3P(S_xO_{1-x})_4$ and a microcrystalline $Li_2S-P_2S_5-LiX$, wherein, M is selected from one or more of Si, Ge, and Sn, N is selected from one or more of Si, Ge, and Sn, X is selected from one or more of Cl, Br, and I, and $0<x<1$; and the nitride solid electrolyte is one or a mixture of two of $Li_3N$ and LiPON.

7. The hybrid solid-liquid electrolyte lithium battery according to claim 6, wherein the preparation method of the lithium battery comprises the following steps:

(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;

(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and (3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

8. The hybrid solid-liquid electrolyte lithium battery according to claim 1, wherein in the solid electrolyte core layer, the electrolyte polymer is one or a mixture of more of polyethylene oxide (PEO), polysiloxane, polypropylene carbonate (PPC), polyethylene carbonate (PEC), polyvinyl chloride (PVC), polyacrylonitrile (PAN), polyacrylic acid (PAA), polyvinylidene fluoride (PVDF), polyvinylidene fluoride-hexafluoropropylene (PVDF-HFP), polymethyl methacrylate (PMMA), polyethylene glycol dimethyl ether (NHD), and polyetherimide (PEI).

9. The hybrid solid-liquid electrolyte lithium battery according to claim 8, wherein the preparation method of the lithium battery comprises the following steps:

(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;

(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and (3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

10. The hybrid solid-liquid electrolyte lithium battery according to claim 1, wherein in the solid electrolyte core layer, the electrolyte additive is one or a mixture of more of stearic acid, a stearate, paraffin, siloxane, metal soap, dibutyl phthalate, dioctyl phthalate, cyclohexane and a sultanate.

11. The hybrid solid-liquid electrolyte lithium battery according to claim 10, wherein the preparation method of the lithium battery comprises the following steps:
(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;
(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and
(3) coextrusion and forming injecting the buffer adhesive prepared in step (1) and the solid electrolyte masterbatch adhesive prepared in step (2) into an extruder, and one-time extruding by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

12. The hybrid solid-liquid electrolyte lithium battery according to claim 1, wherein in the first buffer adhesive layer and the second buffer adhesive layer, the weight ratio of the buffer adhesive layer lithium salt to the buffer adhesive layer additive is (5-15):(1-10), and the weight of the buffer adhesive layer inorganic solid electrolyte accounts for 20%-60% of the weight of the first buffer adhesive layer or the second buffer adhesive layer.

13. The hybrid solid-liquid electrolyte lithium battery according to claim 12, wherein the preparation method of the lithium battery comprises the following steps:
(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;
(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and
(3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

14. The hybrid solid-liquid electrolyte lithium battery according to claim 1, wherein in the first buffer adhesive layer and the second buffer adhesive layer, the buffer adhesive layer lithium salt comprises one or a mixture of more of lithium perchlorate ($LiClO_4$), lithium hexafluoroarsenate ($LiAsF_6$), lithium tetrafluoroborate ($LiBF_4$), lithium hexafluorophosphate ($LiPF_6$), lithium trifluoromethanesulfonate ($LiCF_3SO_3$), lithium bis(trifluoromethanesulfonate)imide (LiTFS), tris(trifluoromethanesulfonate) methyl lithium (LiC(CF3SQ2)31, and lithium bisoxalate borate (LiBOB).

15. The hybrid solid-liquid electrolyte lithium battery according to claim 14, wherein the preparation method of the lithium battery comprises the following steps:
(1) preparation of a buffer adhesive formulating a buffer adhesive for forming the first buffer adhesive layer and the second buffer adhesive layer, specifically involving: dissolving a buffer adhesive layer lithium salt and a buffer adhesive layer additive in a solvent, then adding a buffer adhesive layer inorganic solid electrolyte, and mixing and dispersing same to obtain the corresponding buffer adhesive;
(2) preparation of a solid electrolyte masterbatch adhesive firstly mixing a core layer inorganic solid electrolyte with an electrolyte polymer to make a masterbatch, then adding the masterbatch and the electrolyte additive to an extruder, and heating and mixing same by means of the extruder to obtain the solid electrolyte masterbatch adhesive; and
(3) coextrusion and forming injecting the buffer adhesive prepared in step (1) and the solid electrolyte masterbatch adhesive prepared in step (2) into an extruder, and one-time extruding same by means of a co-extrusion technology, and evaporating the solvent to dryness, so as to obtain a composite solid electrolyte sheet, and then one-time sheet pressing and forming the positive electrode plate and the negative electrode plate by means of a hot pressing lamination process, evaporating the solvent to dryness, and then injecting a liquid electrolyte, to prepare the final hybrid solid-liquid electrolyte lithium battery.

16. The hybrid solid-liquid electrolyte lithium battery according to claim 1, wherein in the first buffer adhesive layer and the second buffer adhesive layer, the buffer adhesive layer additive is one or a mixture of more of polyethylene oxide (PEO), polysiloxane, polypropylene carbonate (PPC), polyethylene carbonate (PEC), polytrimethylene carbonate (PTMC), vinylene carbonate (VC), a fluoroethyl carbonate, and a fluoroethyl carbonate.

* * * * *